(12) United States Patent
Iizuka

(10) Patent No.: US 9,272,737 B2
(45) Date of Patent: Mar. 1, 2016

(54) VEHICLE LOWER STRUCTURE

(71) Applicant: Toyota Jidosha Kabushiki Kaisha, Toyota-shi, Aichi-ken (JP)

(72) Inventor: Hiroharu Iizuka, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/559,166

(22) Filed: Dec. 3, 2014

(65) Prior Publication Data

US 2015/0158533 A1 Jun. 11, 2015

(30) Foreign Application Priority Data

Dec. 5, 2013 (JP) ................................ 2013-252529

(51) Int. Cl.
*B62D 25/20* (2006.01)
(52) U.S. Cl.
CPC .................................. *B62D 25/2045* (2013.01)
(58) Field of Classification Search
CPC ....................................................... B62D 25/20
USPC ....................................... 296/193.07, 187.08
See application file for complete search history.

(56) References Cited

U.S. PATENT DOCUMENTS

| | | | | |
|---|---|---|---|---|
| 7,458,632 B2 * | 12/2008 | Yamada et al. | ........... | 296/193.07 |
| 7,600,807 B2 * | 10/2009 | Bachmann | ............... | 296/187.08 |
| 8,186,735 B2 * | 5/2012 | Maceri et al. | .............. | 296/37.14 |
| 8,733,822 B2 * | 5/2014 | Yoshida | .................... | 296/187.08 |
| 2005/0211496 A1 * | 9/2005 | Ito et al. | ........................ | 180/314 |

FOREIGN PATENT DOCUMENTS

| | | |
|---|---|---|
| JP | 02-099075 U1 | 8/1990 |
| JP | 2002-362419 A | 12/2002 |
| JP | 2013-184569 A | 9/2013 |

* cited by examiner

*Primary Examiner* — Hilary Gutman
(74) *Attorney, Agent, or Firm* — Dinsmore & Shohl LLP

(57) ABSTRACT

A vehicle lower structure includes: a passenger compartment front wall lower portion separating a vehicle-body front portion and a passenger compartment; and a tunnel portion extending toward a vehicle rear side from a central part of the passenger compartment front wall lower portion in a vehicle width direction and projecting toward a vehicle upper side relative to a vehicle body floor. The tunnel portion includes: a rear tunnel constituent portion, a sectional shape thereof perpendicular to an extending direction of the tunnel portion being a semipolygonal shape; and a front tunnel constituent portion, the front tunnel constituent portion being adjacent to a vehicle front side of the rear tunnel constituent portion, a sectional shape thereof perpendicular to the extending direction of the tunnel portion being a semipolygonal section and the number of corners thereof being larger than the number of corners of the rear tunnel constituent portion.

8 Claims, 2 Drawing Sheets

VEHICLE LOWER STRUCTURE

INCORPORATION BY REFERENCE

The disclosure of Japanese Patent Application No. 2013-252529 filed on Dec. 5, 2013 including the specification, drawings and abstract is incorporated herein by reference in its entirety.

BACKGROUND OF THE INVENTION

1. Field of the Invention

The present invention relates to a vehicle lower structure.

2. Description of Related Art

There has been known a structure in which a tunnel portion is provided in a central part of a vehicle lower portion in a vehicle width direction (for example, see Japanese Patent Application Publication No. 2002-362419 (JP 2002-362419 A), Japanese Patent Application Publication No. 2013-184569 (JP 2013-184569 A)). In such a structure, a reinforcing member may be provided on a vehicle front side end of the tunnel portion. In such a configuration, a load from a vehicle-body front side can be stably supported by a front part of the tunnel portion.

However, weight increases due to addition of the reinforcing member in such a structure.

SUMMARY OF THE INVENTION

The present invention provides a vehicle lower structure that is able to stably support a load from a vehicle body front side by a front part of a tunnel portion, while restraining an increase in weight.

An aspect of the present invention relates to a vehicle lower structure. The vehicle lower structure includes: a passenger compartment front wall lower portion constituting a lower part of a passenger compartment front wall separating a vehicle-body front portion and a passenger compartment; and a tunnel portion extending toward a vehicle rear side from a central part of the passenger compartment front wall lower portion in a vehicle width direction and projecting toward a vehicle upper side relative to a general portion of a vehicle body floor. The tunnel portion includes: a rear tunnel constituent portion provided as a constituent portion that does not include a vehicle front side end of the tunnel portion, a sectional shape of the rear tunnel constituent portion perpendicular to an extending direction of the tunnel portion is a semipolygonal shape; and a front tunnel constituent portion provided as a constituent portion including the vehicle front side end of the tunnel portion, the front tunnel constituent portion being adjacent to a vehicle front side of the rear tunnel constituent portion, a sectional shape of the front tunnel constituent portion perpendicular to the extending direction of the tunnel portion is a semipolygonal shape and the number of corners of the semipolygonal shape of the front tunnel constituent portion is larger than the number of corners of the semipolygonal shape of the rear tunnel constituent portion.

According to the above aspect, the tunnel portion includes the front tunnel constituent portion including a vehicle front side end of the tunnel portion, and the rear tunnel constituent portion adjacent to a vehicle rear side of the front tunnel constituent portion, and respective sectional shapes thereof perpendicular to the extending direction of the tunnel portion are a semipolygonal shape. Here, the number of corners of the front tunnel constituent portion is set larger than the number of corners of the rear tunnel constituent portion. As a result, the front tunnel constituent portion is set to have higher rigidity than the rear tunnel constituent portion. In view of this, when a collision load is input to the tunnel portion from a side of the passenger compartment front wall lower portion, it is possible to stably support the load by the front tunnel constituent portion.

As described above, according to the vehicle lower structure according to the aspect of the present invention, it is possible to yield such an excellent effect that a load from a vehicle body front side can be stably supported by a front part of a tunnel portion, while restraining an increase in weight.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Configuration of Embodiment

Figure 1:
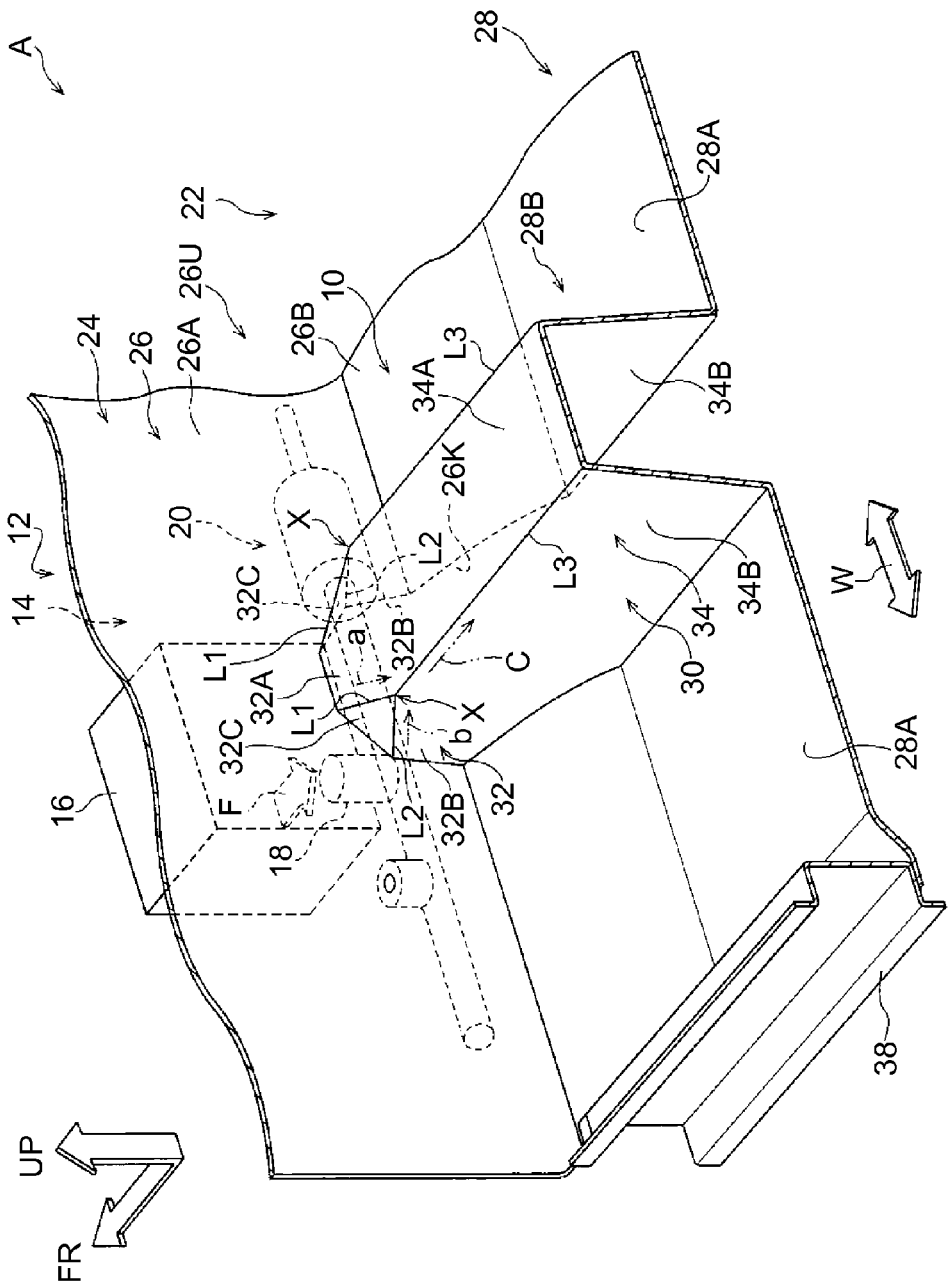
FIG. 1 is a perspective view illustrating part of a vehicle lower structure and its peripheral part thereof according to one embodiment of the present invention.
Figure 2:
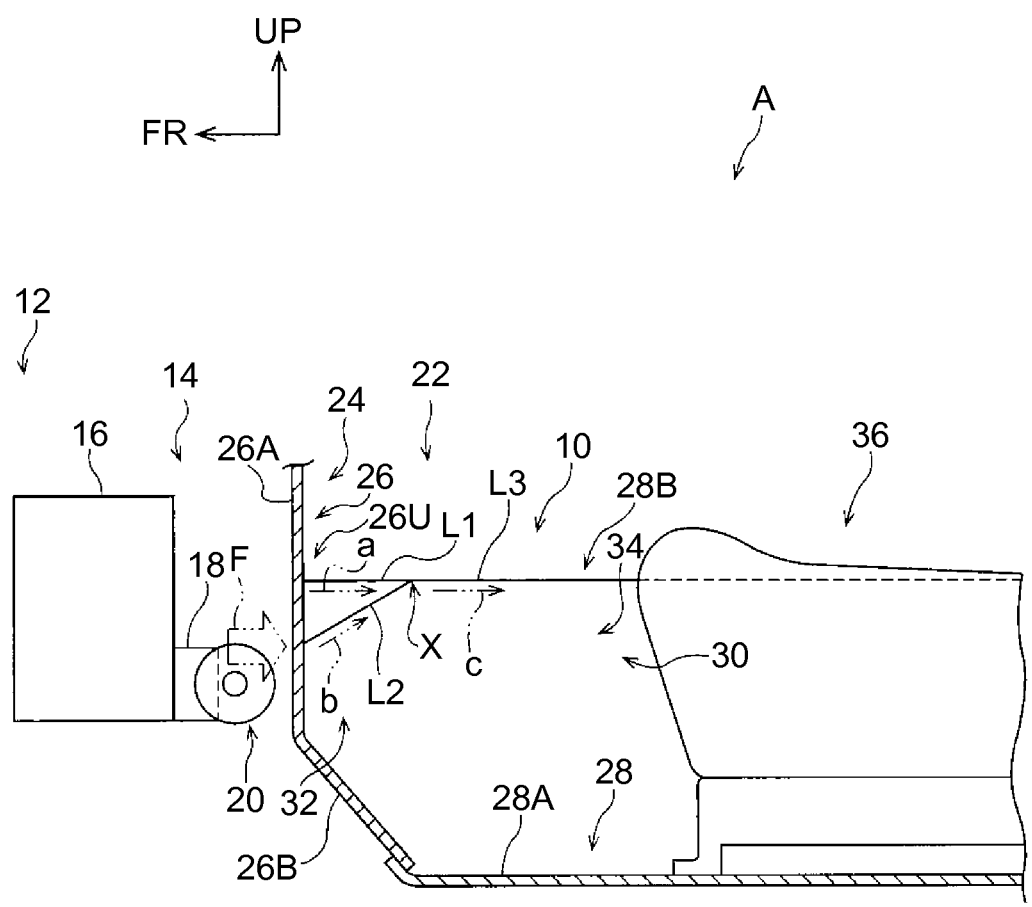
FIG. 2 is a sectional side view illustrating part of a vehicle lower structure and its peripheral part thereof according to one embodiment of the present invention, when viewed from a vehicle lateral side.

The following describes a vehicle lower structure according to one embodiment of the present invention with reference to FIGS. 1 and 2. Note that an arrow FR shown appropriately in each figure indicates a vehicle front side, an arrow UP indicates a vehicle upper side, and an arrow W indicates a vehicle width direction.

FIG. 1 is a perspective view illustrating part of a vehicle lower structure 10 and its peripheral part thereof according to the present embodiment. Further, FIG. 2 is a sectional side view illustrating part of the vehicle lower structure 10 and its peripheral part thereof according to the present embodiment, when viewed from a vehicle lateral side.

As illustrated in FIG. 1, an engine compartment (also referred to as "engine room") 14 is disposed in a vehicle-body front portion 12 of an automobile A. An engine unit 16 is placed in the engine compartment 14. Note that the engine unit 16 is simplified in the figure. The engine unit 16 generates a driving force for the automobile A to run. An output shaft of the engine unit 16 is a drive shaft (not shown) extending in the vehicle width direction. The drive shaft is connected to front wheels (not shown) and the drive shaft is a member that transmits a driving force to the front wheels.

Further, a rear part of the engine unit 16 is supported, via an engine mounting (a mounting member) 18, by a vehicle-body constituent portion (not shown) of the vehicle-body front portion 12 in a vibration inhibiting manner. The engine mounting 18 is placed in the engine compartment 14. Note that a given part of the engine unit 16 except the rear part thereof is also supported, via other engine mountings (not shown), by the vehicle-body constituent part (not shown) of the vehicle-body front portion 12 in a vibration inhibiting manner.

Further, in the engine compartment 14, a steering gear box 20 is provided on a vehicle rear side of the engine unit 16 so as to extend in the vehicle width direction. The steering gear box 20 is connected to a steering wheel (not shown), and is also connected to front wheels (not shown). This enables steering by the steerage of the steering wheel.

The vehicle-body front portion 12 (the engine compartment 14) and a passenger compartment 22 are separated from each other by a dash panel body portion 26 serving as a passenger compartment front wall in the dash panel 24. The dash panel body portion 26 includes an up-down panel portion 26A generally hanging down from an upper end of the dash panel body portion 26 in a generally up-down panel shape. Further, a toeboard portion 26B having an inclined plate shape bent downward toward a vehicle rear side from a lower end of the up-down panel portion 26A so as to be inclined toward a vehicle lower side and the vehicle rear side is formed, and the toeboard portion 26B constitutes a lower end side of the dash panel body portion 26. A dash panel body lower portion 26U as a passenger-compartment-front-wall lower portion constituting a lower part of the dash panel body portion 26 is constituted by a lower end of the up-down panel portion 26A and the toeboard portion 26B.

A notch portion 26K opened toward the vehicle lower side is formed in a central part of the dash panel body lower portion 26U in the vehicle width direction. An edge of the notch portion 26K on its upper side is formed in a lower end of the up-down panel portion 26A, and an opening of the notch portion 26K on its lower side is formed in a lower end of the toeboard portion 26B.

A front end of a floor panel 28 as a vehicle body floor is joined, by spot welding or the like, to an edge of the dash panel body lower portion 26U. The floor panel 28 constitutes a floor of the passenger compartment 22, and includes general portions 28A on both right and left sides, and a floor tunnel portion 28B in a central part thereof in the vehicle width direction.

An outer end of the general portion 28A of the floor panel 28 in the vehicle width direction is joined to a rocker 38. The rocker 38 is provided in a lower end of a vehicle-body side portion so as to extend in a vehicle longitudinal direction. Further, a front end of the floor tunnel portion 28B is joined to an edge side of the notch portion 26K of the dash panel body lower portion 26U via a flange. The floor tunnel portion 28B is provided in the central part of the dash panel body lower portion 26U in the vehicle width direction so as to extend toward the vehicle rear side therefrom, and projects toward the vehicle upper side relative to the general portions 28A of the floor panel 28. Thus, the floor tunnel portion 28B constitutes a tunnel portion 30 solely.

The tunnel portion 30 constitutes part of a body framework portion having a predetermined offset yield strength with respect to a collision load. No reinforcing member such as a reinforcement is attached to the tunnel portion 30 in the present embodiment. The tunnel portion 30 includes a rear tunnel constituent portion 34, which is a constituent portion that does not include a vehicle front side end of the tunnel portion 30, and also includes a front tunnel constituent portion 32, which is a constituent portion that includes the vehicle front side end of the tunnel portion 30. The front tunnel constituent portion 32 is formed adjacent to a vehicle front side of the rear tunnel constituent portion 34 (in a successive manner). Further, the rear tunnel constituent portion 34 includes a vehicle rear side end of the tunnel portion 30.

The rear tunnel constituent portion 34 includes an upper wall portion 34A, and paired right and left side wall portions 34B each hanging down from each outer end of the upper wall portion 34A in the vehicle width direction, and a sectional shape thereof perpendicular to an extending direction of the tunnel portion 30 is a semipolygonal shape. A lower end of the side wall portion 34B is connected to an inner end of the general portion 28A of the floor panel 28 in the vehicle width direction and to an inner end of the toeboard portion 26B in the vehicle width direction.

The rear tunnel constituent portion 34 is set to have two (even number of) corners (in other words, internal corners of the semipolygonal shape in the sectional shape) made, inside the semipolygonal shape, by the upper wall portion 34A and the paired right and left side wall portions 34B adjacent thereto. Note that two corners bent outwardly in the vehicle width direction are formed on lower sides of the paired right and left side wall portions 34B. Further, that sectional shape of the rear tunnel constituent portion 34 which is perpendicular to the extending direction of the tunnel portion 30 is a bilaterally symmetrical shape. A linear edge line portion L3 serving as a boundary portion between the upper wall portion 34A and each of the paired right and left side wall portions 34B extends in the vehicle longitudinal direction.

The front tunnel constituent portion 32 includes: an upper wall portion 32A set on the same plane as the upper wall portion 34A of the rear tunnel constituent portion 34; side wall portions 32B set on the same plane as the side wall portions 34B of the rear tunnel constituent portion 34; and connecting wall portions 32C for connecting the upper wall portion 32A to the side wall portions 32B. That is, the front tunnel constituent portion 32 is configured such that its sectional shape perpendicular to the extending direction of the tunnel portion 30 is a semipolygonal shape, and the number of corners is set larger than the number of corners of the rear tunnel constituent portion 34. A lower end of the side wall portion 32B is connected to the inner end of the toeboard portion 26B in the vehicle width direction.

The front tunnel constituent portion 32 is set to have four (even number of) corners (in other words, internal corners of the semipolygonal shape in the sectional shape) made, inside the semipolygonal shape, by the upper wall portion 32A and the connecting wall portions 32C and by the connecting wall portions 32C and the side wall portions 32B. Note that two corners bent outwardly in the vehicle width direction are formed on lower sides of the paired right and left side wall portions 32B. Further, that sectional shape of the front tunnel constituent portion 32 which is perpendicular to the extending direction of the tunnel portion 30 is a bilaterally symmetrical shape.

The connecting wall portion 32C is formed in a triangular shape in which a up-donw-panel-portion-26A side of the dash panel body portion 26 is a base and a front end side of the edge line portion L3 of the rear tunnel constituent portion 34 is a vertex, and a base side (the up-down-panel-portion-26A side of the dash panel body portion 26) is inclined outwardly in the vehicle width direction toward the vehicle lower side. Hereby, that sectional shape of the front tunnel constituent portion 32 which is perpendicular to the extending direction of the tunnel portion 30 is formed so as to gradually follow the sectional shape of a vehicle front side end of the rear tunnel constituent portion 34 (the sectional shape perpendicular to the extending direction of the tunnel portion 30), as it goes toward the vehicle rear side. A linear edge line portion L1 serving as a boundary portion between the upper wall portion 32A and the connecting wall portion 32C is inclined outwardly in the vehicle width direction toward the vehicle rear side, and is continuous with a front end of the edge line portion L3 of the rear tunnel constituent portion 34. Further, a linear edge line portion L2 serving as a boundary portion between the side wall portion 32B and the connecting wall portion 32C is inclined upward in a vehicle up-down direction toward the vehicle rear side, and is continuous with the front end of the edge line portion L3 of the rear tunnel constituent portion 34.

Further, as illustrated in FIG. 2, a boundary portion (a position, in the vehicle longitudinal direction, of an intersection X where the edge line portions L1, L2, L3 intersect with each other) between the front tunnel constituent portion 32 and the rear tunnel constituent portion 34 is set to a position on the vehicle front side relative to a seat 36 on which an occupant sits in the passenger compartment 22.

Operation/Working-Effects of Embodiment

Operation/working-effects of the embodiment are described below.

As illustrated in FIG. 1, in the present embodiment, the number of corners of the front tunnel constituent portion 32 is set larger than the number of corners of the rear tunnel constituent portion 34. In view of this, the front tunnel constituent portion 32 is set to have more edge line portions than the rear tunnel constituent portion 34, so that its rigidity increases. Therefore, when a collision load F is input into the tunnel portion 30 via the dash panel body lower portion 26U from the engine unit 16 or the like in the engine compartment 14 at the time of a front end collision, it is possible to stably support the collision load F by the front tunnel constituent portion 32. Further, since a rigid difference is set between the front tunnel constituent portion 32 and the rear tunnel constituent portion 34, when a collision load F of a predetermined value or more is input into the tunnel portion 30 from a dash-panel-body-lower-portion-26U side, the load is concentrated on the boundary portion (mainly, the intersection X where the edge line portions L1, L2, L3 intersect with each other) between the front tunnel constituent portion 32 and the rear tunnel constituent portion 34, thereby making it possible to deform the tunnel portion 30 by a stable deformation mode with the boundary portion as an origin of the deformation. Hereby, an impact is absorbed effectively.

Here, supplementary explanation is given with a comparative structure as follows. In a tunnel portion according to the comparative structure in which a sectional shape perpendicular to its extending direction is generally reverse U-shaped, for example, when a deformable bead to serve as an origin of deformation at the time of a front collision is formed in a front end of the tunnel portion, rigidity of the front end of the tunnel portion is decreased because of the deformable bead. On the other hand, in the present embodiment, even if the origin of deformation is set, such a decrease in rigidity does not occur, and it is possible to set the front tunnel constituent portion 32 to have high rigidity.

Further, in the present embodiment, the sectional shape of the front tunnel constituent portion 32 is formed so as to gradually follow the sectional shape of the vehicle front side end of the rear tunnel constituent portion 34 as it goes toward the vehicle rear side, and the edge line portions L1, L2 of the front tunnel constituent portion 32 are continuous with the edge line portion L3 of the rear tunnel constituent portion 34. In view of this, when a collision load F is input into the front tunnel constituent portion 32 from the dash-panel-body-lower-portion-26U side, the collision load F is effectively transmitted to the rear tunnel constituent portion 34 from the front tunnel constituent portion 32 mainly via the edge line portions L1, L2, L3 as a load transfer passage (see arrows a, b, c). According to the vehicle lower structure of the present embodiment, when a collision load is input at the time of a front end collision of the vehicle, such an excellent effect can be obtained that the load can be effectively transmitted from the front tunnel constituent portion to the rear tunnel constituent portion.

Further, as illustrated in FIG. 2, in the present embodiment, the boundary portion (the position, in the vehicle longitudinal direction, of the intersection X where the edge line portions L1, L2, L3 intersect with each other) between the front tunnel constituent portion 32 and the rear tunnel constituent portion 34, that is, a rigidity change part in the tunnel portion 30, is set to a position on the vehicle front side relative to the seat 36 on which an occupant sits in the passenger compartment 22. In view of this, when a collision load F of a predetermined value or more is input into the tunnel portion 30 via the dash panel body lower portion 26U from a vehicle-body-front-portion-12 side at the time of a front end collision, the load is concentrated on the boundary portion (mainly, the intersection X where the edge line portions L1, L2, L3 intersect with each other) between the front tunnel constituent portion 32 and the rear tunnel constituent portion 34 in the tunnel portion 30, so that the tunnel portion 30 is deformed stably in a position on the vehicle front side relative to the seat 36 with the boundary portion as the origin of the deformation. According to the vehicle lower structure of the present embodiment, such an excellent effect can be yielded that, when a collision load of a predetermined value or more is input at the time of a front end collision of the vehicle, the tunnel portion can be stably deformed in a position on the vehicle front side relative to the seat.

Note that, as illustrated in FIG. 1, those sectional shapes of the front tunnel constituent portion 32 and the rear tunnel constituent portion 34 which are perpendicular to the extending direction of the tunnel portion 30 are bilaterally symmetrical shapes. Hereby, it is possible to transmit the collision load F from the vehicle-body-front-portion-12 side toward the vehicle rear side in a good right and left balance.

As described above, according to the vehicle lower structure 10 of the present embodiment, it is possible to stably support a load from the vehicle-body-front-portion-12 side by the front part of the tunnel portion 30, while restraining an increase in weight. Further, in the present embodiment, it is possible to achieve a compact body structure.

Further, in the present embodiment, those sectional shapes of the front tunnel constituent portion 32 and the rear tunnel constituent portion 34 which are perpendicular to the extending direction of the tunnel portion 30 are bilaterally symmetrical shapes, and, in addition to that, the number of internal corners of the semipolygonal shape in each of the sectional shapes is set to an even number. In view of this, top faces of the upper wall portions 32A, 34A are set to be horizontal, so that inner members such as a console box (not shown) can be provided easily, for example, thereby making it possible to effectively use a top face of the tunnel portion 30.

Supplementary Description of Embodiment

Note that, as a modification of the embodiment, the tunnel portion may be configured such that: a dash tunnel portion is formed so as to extend from an opening edge of a notch portion (26K) of a dash panel (24) toward an inner side of a passenger compartment 22 and to integrally project toward the vehicle upper side from inner ends of right and left toeboard portion (26B) in the vehicle width direction; a floor tunnel portion is formed so as to integrally project toward the vehicle upper side from inner ends of general portions (28A) of a floor panel (28) in the vehicle width direction; and a rear end of the dash tunnel portion is joined to a front end of the floor tunnel portion. In this case, for example, a part constituted by the floor tunnel portion may be assumed a rear tunnel constituent portion having the same number of corners as the rear tunnel constituent portion 34 of the above embodiment, and a part constituted by the dash tunnel portion may be assumed a front tunnel constituent portion having the same number of corners as the front tunnel constituent portion 32 of the above embodiment. Further, in this case, an edge line portion of the front tunnel constituent portion and an edge line portion of the rear tunnel constituent portion are preferably continuous with each other similarly to the above embodiment. However, the edge line portion of the front tunnel constituent portion may be entirely or partially discontinuous with the edge line portion of the rear tunnel constituent portion.

Further, as a modification of the embodiment, the boundary portion between the front tunnel constituent portion and the rear tunnel constituent portion may not be set in a position on the vehicle front side relative to a front end of the seat on which the occupant sits in the passenger compartment.

Further, as a modification of the embodiment, the front tunnel constituent portion may be set such that the number of internal corners of the semipolygonal shape of the section thereof perpendicular to the extending direction of the tunnel portion is three, five, six or the like number except four and is set to the number larger than the number of internal corners of the semipolygonal shape of the rear tunnel constituent portion. Further, as a modification of the embodiment, the rear tunnel constituent portion may be set such that the number of internal corners of the semipolygonal shape of the section thereof perpendicular to the extending direction of the tunnel portion is three, four, or the like number except two and is set to the number less than the number of internal corners of the semipolygonal shape of the front tunnel constituent portion.

Note that the "semipolygonal shape" as described in claim 1 indicates a shape in which a polygonal shape surrounded by three or more line segments is divided in two, and the semipolygonal shape is not limited to the example in the above embodiment.

Further, as a modification of the embodiment, the front tunnel constituent portion and the rear tunnel constituent portion may be configured such that their sectional shapes perpendicular to the extending direction of the tunnel portion are set to be bilaterally asymmetrical.

Further, in the above embodiment, the engine compartment 14 in which the engine unit 16 is provided is disposed in the vehicle-body front portion 12. However, the vehicle lower structure 10 of the above embodiment may be applied to an automobile in which a power unit chamber including an engine and an electric motor (power unit) is disposed in a vehicle-body front portion.

Note that the above embodiments and the plurality of modifications described above can be combined appropriately to perform the present invention.

The embodiment of the present invention has been described above, but the present invention is not limited to the above and may be modified in various ways to be performed as long as the modifications are not beyond the gist thereof.

What is claimed is:

1. A vehicle lower structure comprising:
   a passenger compartment front wall lower portion constituting a lower part of a passenger compartment front wall separating a vehicle-body front portion and a passenger compartment; and
   a tunnel portion extending toward a vehicle rear side from a central part of the passenger compartment front wall lower portion in a vehicle width direction and projecting toward a vehicle upper side relative to a general portion of a vehicle body floor, wherein
   the tunnel portion includes:
      a rear tunnel constituent portion provided as a constituent portion that does not include a vehicle front side end of the tunnel portion, a sectional shape of the rear tunnel constituent portion perpendicular to an extending direction of the tunnel portion is a semipolygonal shape; and
      a front tunnel constituent portion provided as a constituent portion including the vehicle front side end of the tunnel portion, the front tunnel constituent portion being adjacent to a vehicle front side of the rear tunnel constituent portion, a sectional shape of the front tunnel constituent portion perpendicular to the extending direction of the tunnel portion being a semipolygonal shape and the number of corners of the semipolygonal shape of the front tunnel constituent portion being larger than the number of corners of the semipolygonal shape of the rear tunnel constituent portion,
   wherein the front tunnel constituent portion includes triangular shaped connecting wall portions having a front end side connected to the passenger compartment front wall lower portion.

2. The vehicle lower structure according to claim 1, wherein:
   the sectional shape of the front tunnel constituent portion is formed so as to gradually follow a sectional shape of the vehicle front side end of the rear tunnel constituent portion as it goes toward the vehicle rear side; and
   an edge line portion of the front tunnel constituent portion is continuous with an edge line portion of the rear tunnel constituent portion.

3. The vehicle lower structure according to claim 1, wherein:
   a boundary portion between the front tunnel constituent portion and the rear tunnel constituent portion is set in a position on a vehicle front side relative to a seat on which an occupant sits in the passenger compartment.

4. The vehicle lower structure according to claim 1, wherein:
   the sectional shapes of the front tunnel constituent portion and the rear tunnel constituent portion are bilaterally symmetrical shapes, and the number of internal corners of the semipolygonal shapes of the sectional shapes is set to an even number.

5. A vehicle lower structure comprising:
   a passenger compartment front wall lower portion constituting a lower part of a passenger compartment front wall separating a vehicle-body front portion and a passenger compartment; and
   a tunnel portion extending toward a vehicle rear side from a central part of the passenger compartment front wall lower portion in a vehicle width direction and projecting toward a vehicle upper side relative to a general portion of a vehicle body floor, wherein
   the tunnel portion includes:
      a rear tunnel constituent portion provided as a constituent portion that does not include a vehicle front side end of the tunnel portion, a sectional shape of the rear tunnel constituent portion perpendicular to an extending direction of the tunnel portion is a semipolygonal shape; and
      a front tunnel constituent portion provided as a constituent portion including the vehicle front side end of the tunnel portion, the front tunnel constituent portion being adjacent to a vehicle front side of the rear tunnel constituent portion, a sectional shape of the front tunnel constituent portion perpendicular to the extending direction of the tunnel portion being a semipolygonal shape and the number of corners of the semipolygonal shape of the front tunnel constituent portion being larger than the number of corners of the semipolygonal shape of the rear tunnel constituent portion, wherein the rear tunnel constituent portion includes a rear upper wall, the front tunnel constituent portion includes a front upper wall connected to the passenger compartment front wall lower portion, and the rear upper wall extends planar with the front upper wall.

6. The vehicle lower structure according to claim 5, wherein:

the sectional shape of the front tunnel constituent portion is formed so as to gradually follow a sectional shape of the vehicle front side end of the rear tunnel constituent portion as it goes toward the vehicle rear side; and an edge line portion of the front tunnel constituent portion is continuous with an edge line portion of the rear tunnel constituent portion.

7. The vehicle lower structure according to claim 5, wherein:

a boundary portion between the front tunnel constituent portion and the rear tunnel constituent portion is set in a position on a vehicle front side relative to a seat on which an occupant sits in the passenger compartment.

8. The vehicle lower structure according to claim 5, wherein:

the sectional shapes of the front tunnel constituent portion and the rear tunnel constituent portion are bilaterally symmetrical shapes, and the number of internal corners of the semipolygonal shapes of the sectional shapes is set to an even number.

\* \* \* \* \*